United States Patent
Sanjeev

(10) Patent No.: US 9,125,141 B1
(45) Date of Patent: Sep. 1, 2015

(54) MOBILE DEVICE AND METHOD FOR MANAGING DROPPED CALLS DUE TO LOST SIGNAL

(75) Inventor: Kumar Sanjeev, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 261 days.

(21) Appl. No.: 12/973,318

(22) Filed: Dec. 20, 2010

(51) Int. Cl.
*H04W 4/00* (2009.01)
*H04W 48/16* (2009.01)
*H04W 8/24* (2009.01)

(52) U.S. Cl.
CPC .............. *H04W 48/16* (2013.01); *H04W 8/245* (2013.01)

(58) Field of Classification Search
CPC ............................. H04W 48/16; H04W 8/245
USPC .................... 455/418, 417, 414.1, 452.2, 434
See application file for complete search history.

(56) References Cited

U.S. PATENT DOCUMENTS

| | | | |
|---|---|---|---|
| 6,445,918 B1 | 9/2002 | Hellander | |
| 7,272,399 B2 | 9/2007 | Han | |
| 7,486,949 B2* | 2/2009 | Ignatin | 455/414.1 |
| 2002/0090947 A1 | 7/2002 | Brooks et al. | |
| 2004/0203645 A1* | 10/2004 | Forman et al. | 455/414.1 |
| 2008/0020748 A1* | 1/2008 | Parker et al. | 455/423 |
| 2011/0034159 A1* | 2/2011 | Philmon et al. | 455/418 |

* cited by examiner

*Primary Examiner* — Chuck Huynh

(57) ABSTRACT

In the examples, a mobile station runs an application in the background to monitor for call failures and fix dropped calls. When a call is dropped due to a loss of signal, the application monitors for signals from the mobile communication network. When execution of the application indicates to the mobile station that signal strength is back and steady, the application causes the mobile station to reconnect the dropped call again. The mobile station may beep and/or display an alert window to let the user know that it is reconnecting. The user can cancel reconnection at this time if he/she prefers. From the user's perspective, there is no need to manually initiate a new call to reconnect and no need to check for signal bars to determine when a reconnection becomes possible after signal is back.

20 Claims, 5 Drawing Sheets

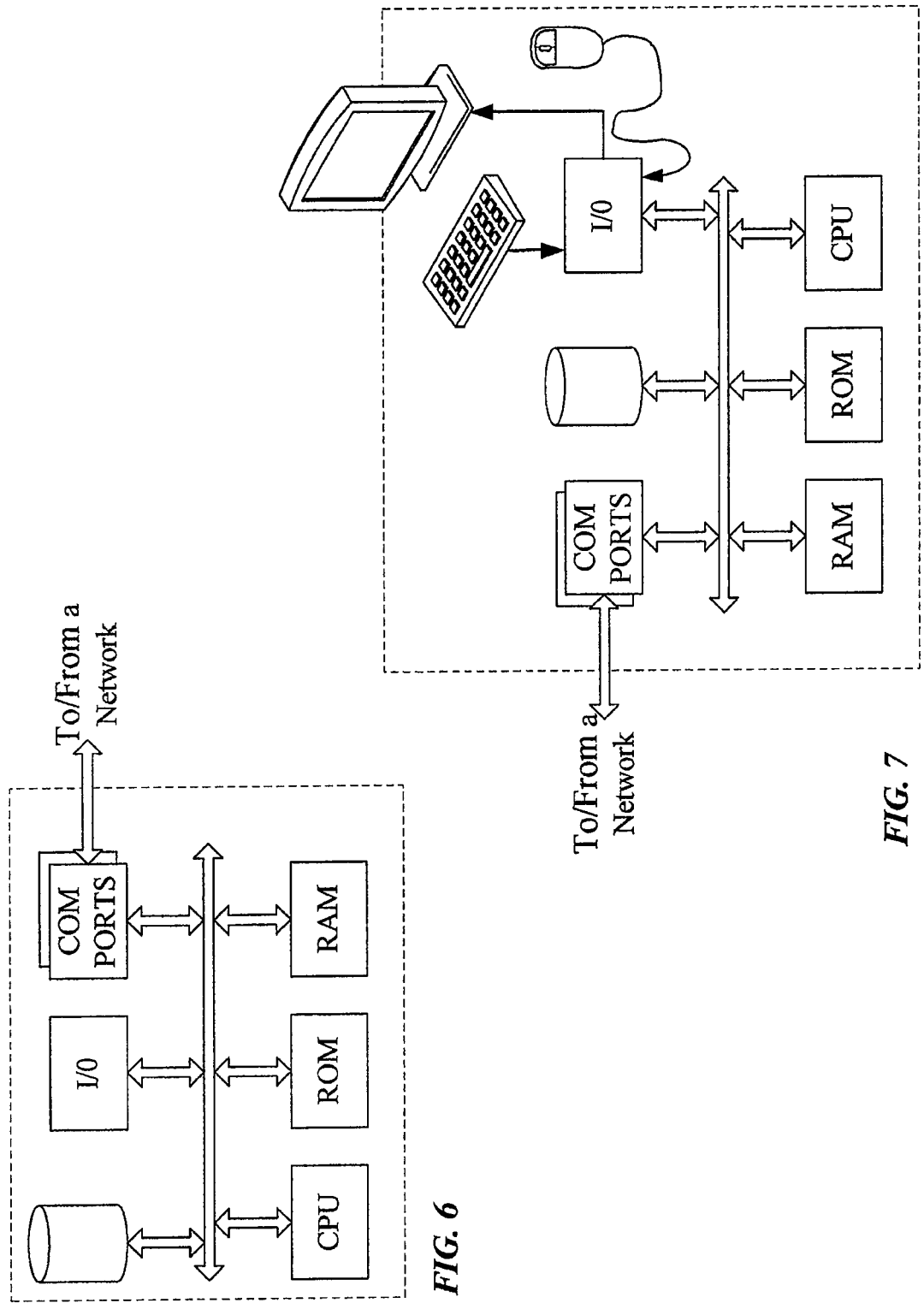

MOBILE DEVICE AND METHOD FOR MANAGING DROPPED CALLS DUE TO LOST SIGNAL

TECHNICAL FIELD

The present subject matter relates to techniques and equipment to enable a mobile communication device to manage a call that is dropped during communication due to a loss of signal.

BACKGROUND

In recent years, mobile communication services have expanded and increased in popularity, around the world. Many advanced networks offer wireless mobile communication service for voice calls, mobile messaging services (e.g., text and/or multimedia) and data communications. Mobile devices enjoying various mobile communication services are omnipresent in various places, so the mobile devices often lose on-going voice calls and data communications for diverse reasons for losing signals, such as gaps in cellular coverage, system congestion during periods of heavy usage and failure of call handoffs.

Various procedures have been proposed for re-establishing a voice call after it is dropped. The proposed procedures involve use of some of the network elements to recover from lost signal. The re-establishing of a dropped call by the side of network elements of a wireless network places additional burden on the busy wireless network. Also, in such procedures, the network may even reconnect a dropped call to a mobile device of a user who does not want to re-establish the dropped call.

A need therefore exists for technology to re-establish a dropped call without consuming resources of wireless network elements to thereby lower burden on the wireless network. Another need exists for re-establishing a dropped call in a manner that considers the mobile station user's intention on whether or not he wants to re-connect the dropped call.

SUMMARY

The teachings herein address one or more of the above noted needs relating to re-establishment of a dropped call on the initiative of a mobile station.

An aspect of the disclosure encompasses a method for reestablishing a dropped call. Programming in a processor of a mobile station is executed to cause the station to monitor a call communication through a wireless mobile communication network. Dropping of the call due to a loss of signal from the network is detected at the mobile station. The mobile station monitors a signal from the network, and detects availability of the signal from the network. Responsive to the detection of availability of the signal, the mobile station automatically reinitiates the call from the mobile station through the network.

The detection of availability of the signal from the network may involve determining that the signal from the network meets or exceeds minimum strength and the signal exceeding the minimum strength is available for at least a predetermined period. An alert may be provided for a user of the mobile station to indicate that the mobile station is re-initiating the call through the network. The re-initiated call then may be canceled before completion to a destination in response to a user input to the mobile station based on the alert. In the disclosed examples, the executed programming is pre-installed or downloaded from the wireless network upon request of a user of the mobile station.

Techniques such as outlined above may be embodied in an appropriately configure mobile station or in programming that enables a mobile station the dropped call re-connection Data regarding the dropped call is stored at the mobile station, and the mobile station reinitiates the dropped call using the stored data regarding the dropped call.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a simplified functional block diagram of a computer that may be configured as a host or server, for example, to function as a server to download a dropped call management application into a mobile station like one of those shown in FIGS. 2 and 3.

FIG. 7 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various techniques, mobile stations and applications programming discussed herein implement a technique to enable mobile stations to manage calls that are dropped during communication due to a loss of signal. The mobile station will run an application in the background to monitor for call failures and fix dropped calls. When an ongoing call is dropped due to a loss of signal, the application monitors for signals from the mobile communication network and will reconnect when the network signal becomes available again. When execution of the application indicates to the mobile station that signal strength is back and steady, the application causes the mobile station to reconnect the dropped call. In an example, the mobile station will beep and display an alert window to let the user know that it is reconnecting. The user can cancel reconnection at this time if he/she prefers. From the user's perspective, there is no need to manually initiate a new call to reconnect and no need to check for signal bars to determine when a reconnection becomes possible after signal is back. However, the user may choose not to reconnect, e.g., if the user intends not to resume the conversation.

Reference now is made in detail to the examples illustrated in the accompanying drawings and discussed below.

Figure 1:
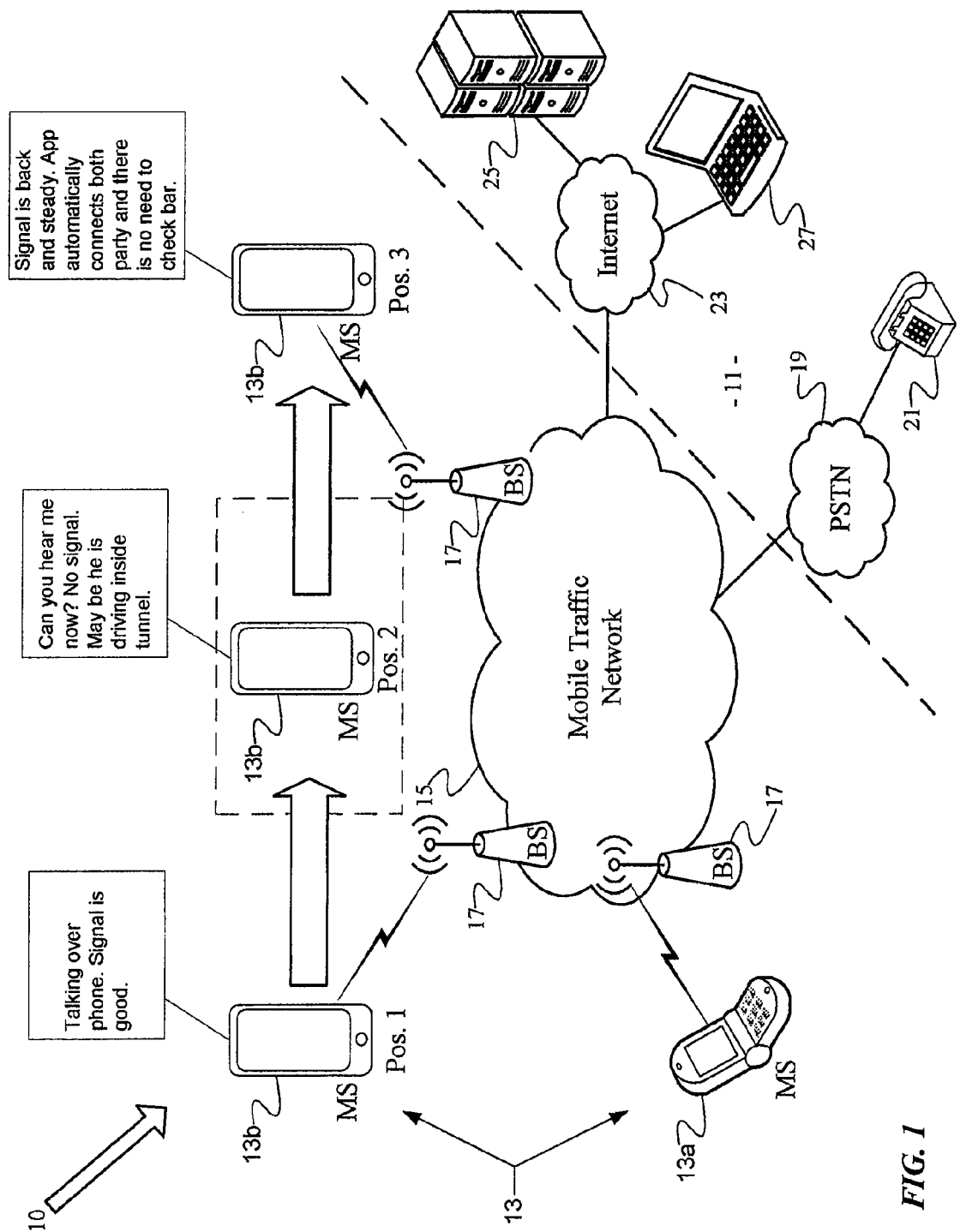
FIG. 1 is a high-level functional block diagram of an example of a system of networks/devices that provide various communications for mobile stations and shows an example of the process for managing a dropped call from one of the mobile stations as the user moves from place to place.

FIG. 1 illustrates a system 10 offering a variety of mobile communication services, including voice call services and data communication services by mobile station users. The example shows simply two mobile stations (MSs) 13a and 13b as well as a mobile communication network 15. The stations 13a and 13b are examples of mobile stations that may be used for various communications, and for purposes of this discussion, may be used for reconnecting a dropped call due to loss of signal. However, the network will provide similar communications for many other similar users as well as for mobile devices/users that do not participate in the reconnection of a dropped call. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may be capable of voice telephone communications through the network 15, and for the data communication services, the exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks. The mobile stations 13a and 13b implementing the reconnection of a dropped call also can receive and execute applications written in various programming languages, as discussed more later.

Mobile stations 13 can take the form of portable handsets, smart-phones or personal digital assistants, although they may be implemented in other form factors. Program applications, including an application to assist in the reconnection of a dropped call service and/or any an application purchased via the on-line Application store can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than voice call services such as messaging service messages and various data communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

A mobile station 13 communicates over the air with a base station 17 and through the traffic network 15 for various voice and data communications, e.g., through the Internet 23 with a server 25. Server such as 25 may provide any of a variety of common application or service functions in support of or in addition to an application program running on the mobile station 13. However, for purposes of further discussion, we will focus on functions thereof in support of the reconnection of a dropped call by a mobile station 13.

By way of an example, assume that the user of mobile station 13b is involved in a telephone voice conversation with another party, who may be using mobile station 13a or landline telephone 21. However, at some point after the start of the voice call the user moves. In our example, at position 1, the user is talking over phone via mobile station 13b, and the network signal is good. As the user moves to a second position 2, for example, into a tunnel or elevator that blocks signals to/from the base station 17, the mobile station 13b no longer receives network signals. The user may try to say something like "Can you hear me now?" before the call is dropped as she or he is driving inside a tunnel. In our example, as the user leaves the tunnel or the like and reaches position 3, the network signal is back and steady. The application programming enables the mobile station 13b to automatically connect both parties and there is no need to check signal bars on the mobile station display or manually re-call the other party involved in the dropped call.

The enhanced reconnection of a dropped call service under consideration here may be delivered to touch screen type mobile stations as well as to non-touch type mobile stations. Hence, our simple example shows the mobile station (MS) 13a as a non-touch type mobile station and shows the mobile station (MS) 13b as a touch screen type mobile station.

In a specific example, a call is dropped due to a loss of signal by the mobile station 13b although the mobile station 13b may provide similar dropped call reconnection. The dropped call may be between mobile stations 13a and 13b or between mobile station 13b and landline telephone 21.

Implementation of the reconnection of a dropped call will involve at least some execution of programming in the mobile stations as well as implementation of user input/output functions and data communications through the network 15, from the mobile stations.

Those skilled in the art presumably are familiar with the structure, programming and operations of the various types of mobile stations. However, for completeness, it may be useful to consider the functional elements/aspects of two exemplary mobile stations 13a and 13b, at a high-level.

Figure 2:
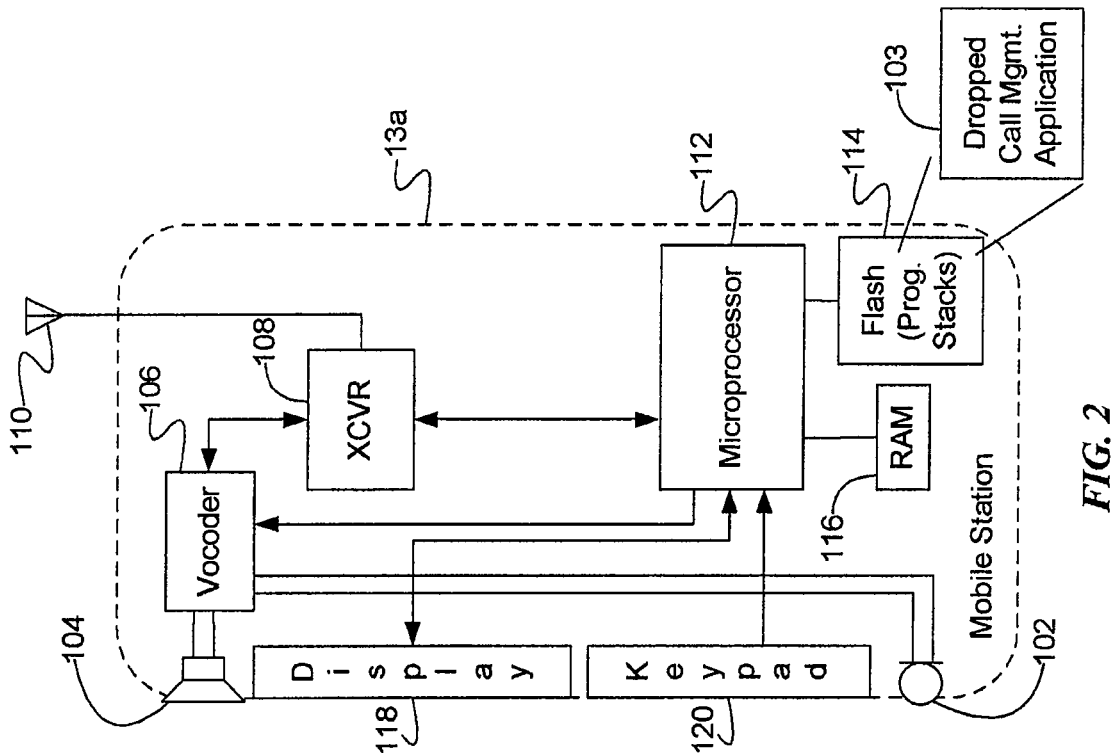
FIG. 2 is a high-level functional block diagram of an exemplary non-touch type mobile station as may implement an application for managing dropped calls.

For purposes of such a discussion, FIG. 2 provides a block diagram illustration of an exemplary non-touch type mobile station 13a. Although the mobile station 13a may be a smartphone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of the mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like, call related information dialed by the user, calling party numbers, etc., including an alert on re-initiating of a dropped call. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during the re-initiation of a dropped call. For example, if the mobile station user does not want the re-initiation of a dropped call, he interrupts the re-initiated call via the user interface elements.

A microprocessor 112 serves as a programmable controller for the mobile station 13a, in that it controls all operations of the mobile station 13a in accord with programming that it executes, for all normal operations, and for operations involved in the reconnection procedure of a dropped call under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. As discussed more later, the programming in memory 114 also includes a dropped call management application 103. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for reconnecting a dropped call from a mobile station's side.

Figure 3:
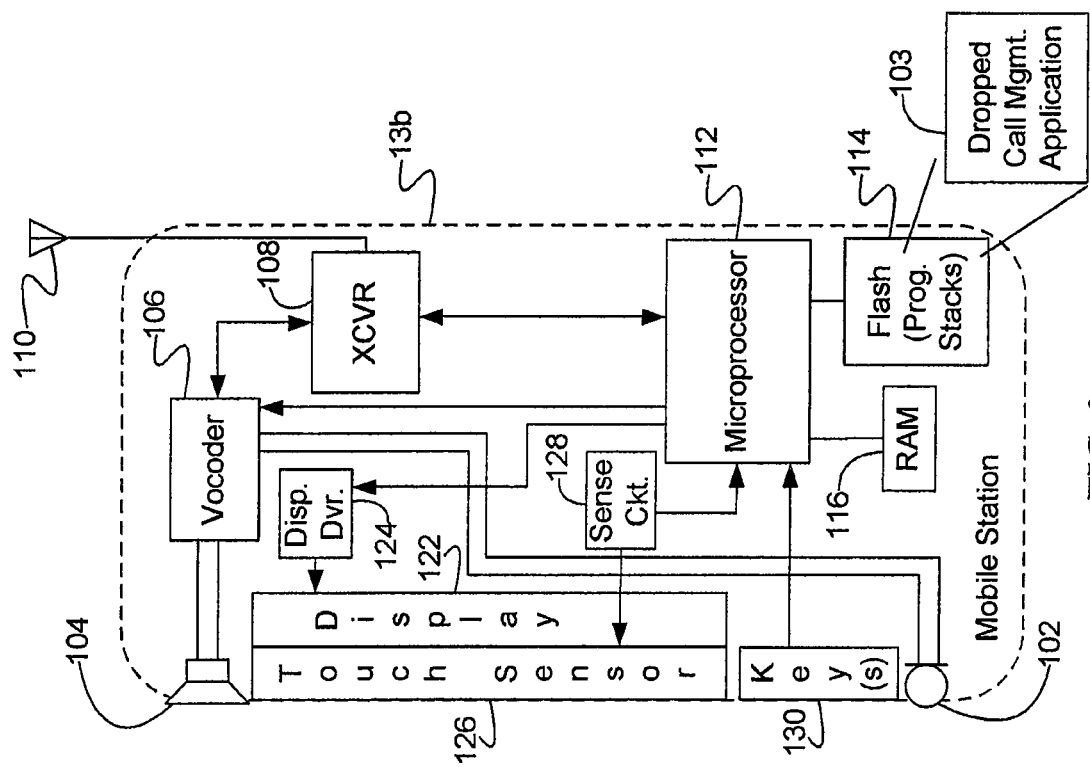
FIG. 3 is a high-level functional block diagram of an exemplary touch screen type mobile station as may implement an application for managing dropped calls.

FIG. 3 provides a block diagram illustration of an exemplary touch screen type mobile station 13b. Although possibly configured somewhat differently, at least logically, a number of the elements of the exemplary touch screen type mobile station 13*b* are similar to the elements of mobile station 13*a*, and are identified by the same reference numbers as used in FIG. 2. For example, the touch screen type mobile station 13*b* includes a microphone 102, speaker 104 and vocoder 106, for audio input and output functions, much like in the earlier example. The mobile station 13*b* also includes a at least one digital transceiver (XCVR) 108, for digital wireless communications, although the handset 13*b* may include an additional digital or analog transceiver. The concepts discussed here encompass embodiments of the mobile station 13*b* utilizing any digital transceivers that conform to current or future developed digital wireless communication standards. As in the station 13*a*, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13*b* and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13*a*, a microprocessor 112 serves as a programmable controller for the mobile station 13*b*, in that it controls all operations of the mobile station 13*b* in accord with programming that it executes, for all normal operations, and for operations involved in the reconnection procedure of a dropped call under consideration here. In the example, the mobile station 13*b* includes flash type program memory 114, for storage of various program routines and mobile configuration settings, in this case, including the dropped call management application 103. The mobile station 13*b* may also include a non-volatile random access memory (RAM) 116 for a working data processing memory. Of course, other storage devices or configurations may be added to or substituted for those in the example. Hence, outlined above, the mobile station 13*b* includes a processor, and programming stored in the flash memory 114 configures the processor so that the mobile station is capable of performing various desired functions, including in this case the functions involved in the technique for providing reconnection of a dropped call.

In the example of FIG. 2, the user interface elements included a display and a keypad. The mobile station 13*b* may have a limited number of keys 130, but the user interface functions of the display and keypad are replaced by a touch screen display arrangement. At a high level, a touch screen display is a device that displays information to a user and can detect occurrence and location of a touch on the area of the display. The touch may be an actual touch of the display device with a finger, stylus or other object, although at least some touch screens can also sense when the object is in close proximity to the screen. Use of a touch screen display as part of the user interface enables a user to interact directly with the information presented on the display.

Hence, the exemplary mobile station 13*b* includes a display 122, which the microprocessor 112 controls via a display driver 124, to present visible outputs to the device user. The mobile station 13*b* also includes a touch/position sensor 126. The sensor 126 is relatively transparent, so that the user may view the information presented on the display 122. A sense circuit 128 senses signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13*b*. The microphone 102 and speaker 104 may be used as additional user interface elements, for audio input and output.

The structure and operation of the mobile stations 13*a* and 13*b*, as outlined above, were described to by way of example, only.

The programming stored in the flash memory performs a below-discussed mechanism to automatically reconnect a dropped call. The programming operates cooperatively with an operating system of the mobile station such as Android, Symbian and IPhone OS. The programming may be pre-installed before activation of the mobile station, or downloaded from a wireless network, for example, via an App store.

Figure 4:
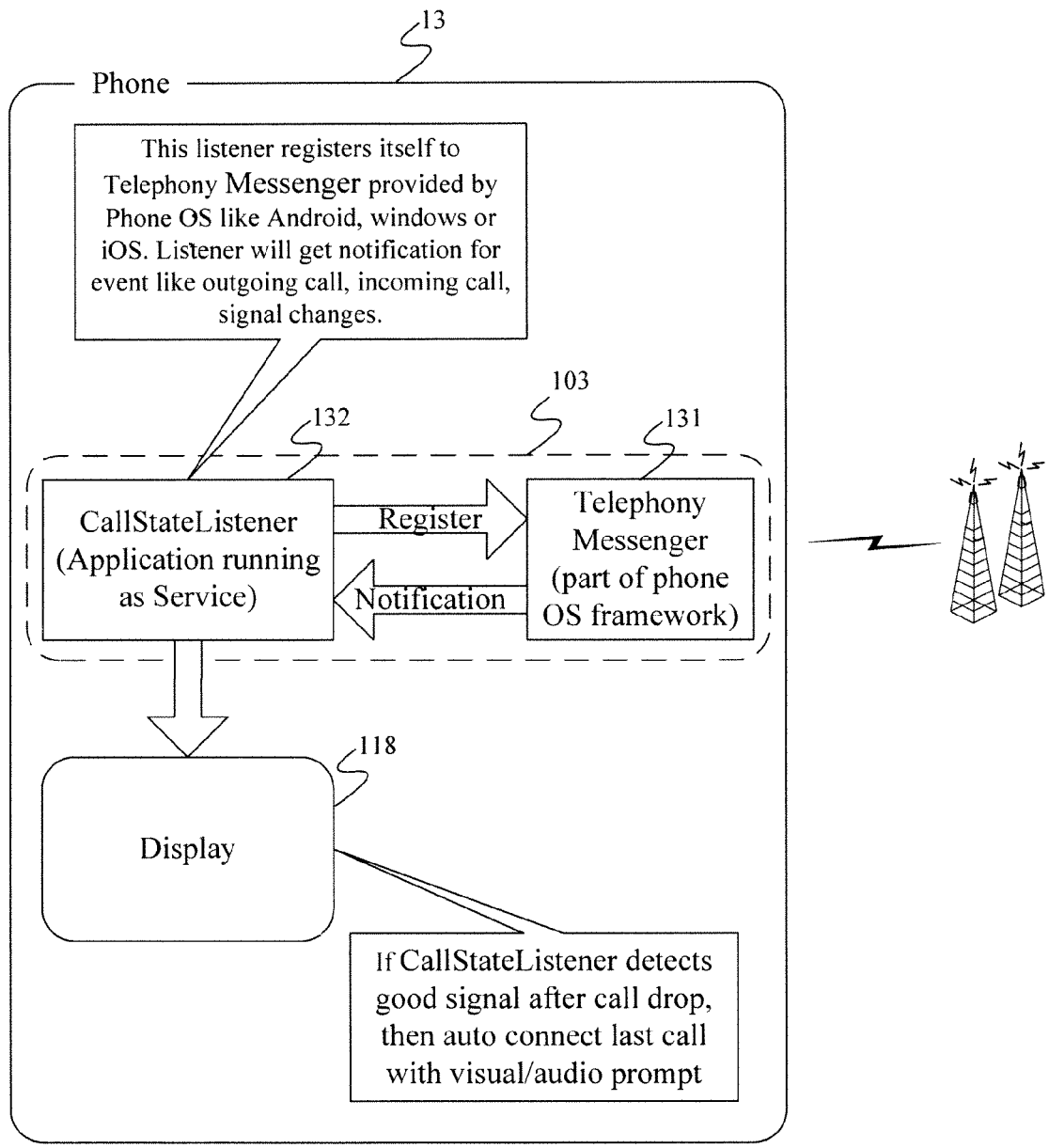
FIG. 4 is a diagram which shows a functional structure of dropped call management programming that may be stored in a flash memory or the like of a mobile station.

FIG. 4 is a diagram which shows a functional structure of dropped call management programming 103 stored in a flash memory of a mobile station 13 (e.g., 13*a* or 13*b*). A telephony messenger 131 interfaces with elements of a wireless network, and serves as a part of mobile phone's Operating System (OS). The telephony messenger 131 receives and checks information on elements of network communications, such as signals from base stations and roaming information. The telephony messenger 131 sends notifications to a call state listener 132, when detecting occurrence of events which are pre-registered by the call state listener 132. The call state listener 132 is an application running on the phone's OS and registers to the telephony messenger 131 to receive notifications from the telephony messenger when events the listener wants to hear occur. The events may be a call dropped due to a signal loss, incoming calls, outgoing calls and signal changes. Other events may relate to dropped calls, e.g., when signal strength goes too low and communication with the network is loss. In the example for reconnecting after, to make sure that the mobile station 13 reconnects a call when a communication link with the wireless network is reliable, the events to which the mobile station listens are for those signals from the wireless network that exceed a predetermined level and are received for at least a predetermined period. The call state listener 132 has additional functions to keep information on a dropped call, place a call to a destination and to visualize placement of a call on a display 118. The telephony messenger 131 and the call state listener may be implemented with a pre-installed programming at the time of activation of the mobile station or be downloaded from the wireless network, e.g., from an App Store.

Figure 5:
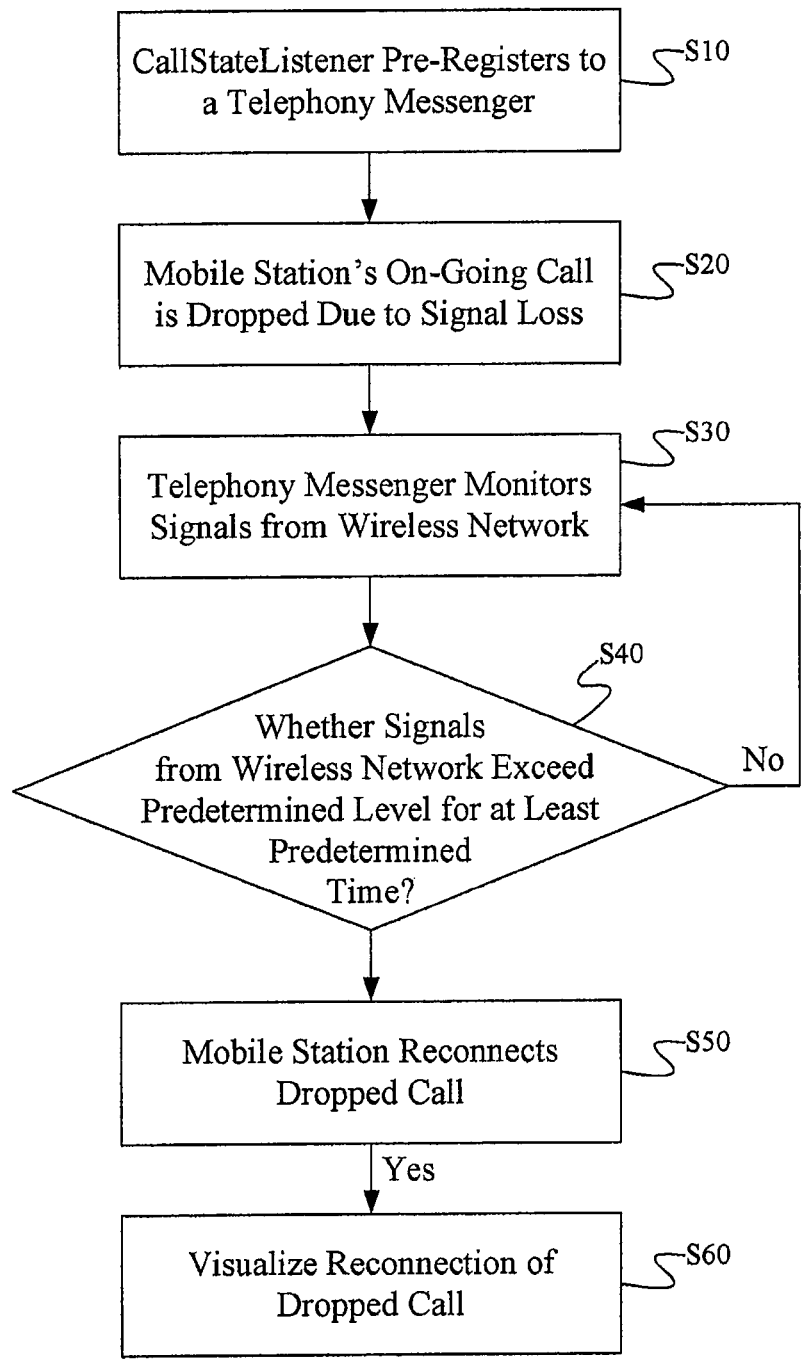
FIG. 5 is a flowchart showing a procedure, implemented by a mobile station, for reconnecting a dropped call due to loss of signal.

FIG. 5 is a flowchart showing procedures for reconnecting a dropped call. The call state listener 132 registers to the telephony messenger 131 to thereby request the telephony messenger 131 to send notifications to the call state listener 132 when a predetermined event occurs. (S10) In this example, the predetermined events include loss of signal (call dropped) and subsequent events indicating that signals from the wireless network exceed a predetermined level should for at least a predetermined period. The use of the threshold in combination with the time period ensures that a wireless communication link between the mobile station and the wireless network is enough for placing a call via the wireless link.

The mobile station places a call to a destination so the user may have an on going call with the destination. The call listener 132 causes the mobile station 13 to monitor a call for the mobile station through the wireless mobile communication network. The on-going call is dropped due to loss of signals from the wireless network, as detected at step S20 in our example. Loss of signals originate from various reasons such as gaps in cellular coverage, system congestion during periods of heavy usage and failure of call handoffs.

After dropping of the ongoing call, the telephony messenger 131 monitors signals sent from the wireless network. (S30) The telephony messenger 131 checks strength and duration of the signals received from the wireless network. For example, the telephone messenger may check if the signals from the wireless network exceed a predetermined level for at least a predetermined period. (S40) If the signals from the wireless network exceed the predetermined level for at the least the predetermined period (Yes, branch at S40), then the telephony messenger 131 sends a notification to the call state listener 132. If the signals from the wireless network do not exceed the predetermined level for at the least the predetermined period, (No branch at S40), the telephony messenger 131 keeps checking strength and duration of the signals sent from the wireless network by returning to step S30.

When the call state listener 132 receives the notification from the telephony messenger 131 that the signals from the wireless network exceeds the predetermined level for at least the predetermined period, automatically initiates a voice call through the network to the other mobile station or telephone involved in the mobile station reconnects the dropped call. (S50) The mobile station in our example also provides a display output, to reconnection of the dropped call on the mobile station at the same time. (S60). The drawing suggest visualization of the prompt, e.g., via the display, however, the prompt may be audible as well as or instead of visual. Since the mobile station user can identify reconnection of the dropped call, the user can interrupt the reconnection process by input via the mobile station if the user does not want the reconnection.

Since the mobile device, on its own, reconnects the dropped call when signals come back, it does not consume resources of the wireless network for reconnection of the dropped call. The reconnection on the side of mobile station allows the mobile station user to interrupt reconnection of the dropped call easily if the user does not want to.

As shown by the above discussion, functions relating to the an enhanced reconnection of a dropped call on the side of a mobile station via a user interface of a mobile station, may be implemented programmable mobile stations.

The requisite programming may be on computers connected for data communication via the components of a packet data network as shown in FIG. 1 for installation in the mobile stations. Although special purpose devices may be used, such computers also may be implemented using one or more hardware platforms intended to represent a general class of data processing device commonly used to run "server" programming so as to implement the reconnection functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the automatic mobile station re-connection of a dropped call. The reconnection software code is executable by the processor of the mobile station, although programming to enable loading of that software to a mobile device is executable by the computer that functions as the server. In operation, the code is stored within the general-purpose computer platform. At other times, however, the software may be stored at other locations and/or transported for loading into the appropriate general-purpose computer system and/or to a mobile station. Execution of such code by a processor of the mobile station processor enables the mobile station to implement the methodology for reconnecting a dropped call, in essentially the manner performed in the implementations discussed and illustrated herein.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, download server functions may be implemented in a distributed fashion on a number of similar platforms, to distribute the processing load.

Hence, aspects of the methods of reconnecting a dropped call outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the programming for reconnecting a dropped call, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The examples above focused on voice call sessions. Those skilled in the art will appreciate that similar technologies may be used to reconnect session or calls for data communications, e.g., streaming audio/video sessions. While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
   registering, by a call state listener program executing on a processor of a mobile station with a telephony messenger program serving as part of an operating system of the mobile station, to receive from the telephony messenger program a notification of an occurrence of a first or second registered event related to calls involving the mobile station, wherein:
   the first registered event is an indication of a low signal strength due to a period of network congestion resulting in a loss of signal from the wireless mobile communication network at the mobile station during a voice over internet protocol call, wherein handoff of the mobile device was unsuccessful; and
   the second registered event is a detection of availability of signals from the wireless communication network exceeding a predetermined level for at least a predetermined period;
   executing the call state listener program and the telephony messenger program by the processor of the mobile station to monitor a call for the mobile station through a wireless mobile communication network;
   detecting, by the telephony messenger program via an interface with the wireless mobile communication network, dropping of the call due to the occurrence of the first registered event;
   based on the detection of the occurrence of the first registered event, sending by the telephony messenger program executing in the operating system a first notification of the occurrence of the first registered event to the call state listener program;
   upon dropping the call due to loss of signal, monitoring by the telephony messenger for a signal meeting or exceeding a predetermined level for a predetermined period from the wireless mobile communication network;
   based on the monitoring, detecting, by the telephony messenger, occurrence of the second registered event;
   responsive to the detection of the second registered event, sending by the telephony messenger program executing in the operating system a second notification to the call state listener program that a wireless mobile communication network signal is available;
   in response to the call state listener program receiving the second notification that the signal from the wireless communication network meets or exceeds a predetermined level for a predetermined period, the call state listener automatically operating the mobile station to re-initiate the call from the mobile station through the wireless mobile communication network; and
   providing a user of the mobile station with an option to cancel re-initiation of the call prior to reconnection of the call through the wireless mobile communication network.

2. The method of claim 1, further comprising, in response to receiving a selection to cancel re-initiation of the call, a step of cancelling the re-initiated call before completion to a destination.

3. The method of claim 1, wherein the programming is pre-installed or downloaded from the wireless mobile communication network upon request by a user of the mobile station.

4. The method of claim 1, wherein the steps performed in claim 1 are performed at the mobile station.

5. The method of claim 1, further comprising storing data regarding the dropped call, and wherein the mobile station reinitiates the dropped call using the stored data regarding the dropped call.

6. The method of claim 1, wherein the option is provided by the mobile station as at least one of a visual prompt on a display of the mobile station or an audible prompt.

7. The method of claim 6, wherein the option is provided as a combination of a visual prompt and an audible prompt.

8. The method of claim 1, further comprising visualizing placement of the re-initiated call on a display of the mobile station.

9. The method of claim 1, further comprising providing an audible alert by the mobile station to indicate that the call is being automatically re-initiated.

10. The method of claim 1, wherein a registered event is an incoming call, an outgoing call and/or a signal change.

11. A mobile station comprising;
    a wireless transceiver for communications through a wireless mobile communication network;
    a display device for presenting a user interface;
    a processor coupled to control the wireless transceiver;
    memory accessible by the processor; and
    programming in the memory for execution by the processor, wherein the programming includes a call state listener program and a telephony messenger program, wherein the telephony messenger serves as part of an operating system of the mobile device,
    wherein execution of the call state listener programming by the processor configures the mobile station to perform functions, including functions to:
    register with the telephony messenger program to receive from the telephony messenger program a notification of an occurrence of a first or second registered event related to calls involving the mobile station, wherein the first registered event is an indication of a low signal strength due to a period of network congestion resulting in a loss of signal from the wireless mobile communication network at the mobile station during a voice over internet protocol call, wherein handoff of the mobile device was unsuccessful, and the second registered event is detection by the telephony messenger program of a signal from the wireless mobile communication network exceeded a predetermined level for a predetermined period;

in response receiving a notification of the occurrence of the first registered event, automatically re-initiate the call from the mobile station through the wireless mobile communication network; and present via the display device an option to cancel re-initiation of the call prior to reconnection of the call through the wireless mobile communication network; and wherein execution of the telephony messenger programming serving as part of the operating system configures the mobile station to perform functions, including functions to:

monitor a call for the mobile station via the wireless transceiver through the wireless mobile communication network;

based on the monitoring, detect dropping of the call due to the occurrence of the first registered event, sending a first notification of the occurrence of the first registered event to the call state listener program;

upon dropping the call due to loss of signal, monitor for a signal meeting or exceeding a predetermined level for a predetermined period from the wireless mobile communication network;

detect the occurrence of the second registered event; and responsive to the occurrence of the second registered, generate a second notification that a wireless mobile communication network signal is available;

wherein further execution of the call state listener programming by the processor configures the mobile station to perform further functions, including functions to:

in response to receiving the second notification that the signal from the wireless communication network exceeds a predetermined level for a predetermined period, automatically operate the mobile station to re-initiate the call from the mobile station through the wireless mobile communication network; and provide a user of the mobile station with an option to cancel re-initiation of the call prior to reconnection of the call through the wireless mobile communication network.

12. The mobile station of claim 11, wherein the mobile station further cancels the re-initiated call before completion to a destination in response to a user input to the mobile station based on the alert selection of the option to cancel re-initiation of the call.

13. The mobile station of claim 11, wherein the call state listener programming is pre-installed or downloaded from the wireless mobile communication network upon request by a user of the mobile station.

14. The mobile station of claim 11, wherein the programming operates integrally with an operating system of the mobile station.

15. The mobile station of claim 11, wherein the memory stores data regarding the dropped call and the dropped call is reinitiated by use of the stored data regarding the dropped call in the memory.

16. The mobile station of claim 11, wherein the telephony messenger program executes as part of the operating system of the mobile station, and the call state listener program executes as an application running on the mobile station's operating system.

17. An article of manufacture comprising:

a non-transitory machine readable medium; and programming embodied in the non-transitory machine readable medium for execution by a processor of a mobile station, wherein the programming includes a call state listener program and an operating system including a telephony messenger program serving as part of an operating system framework and execution of the programming by the processor configures the mobile station to perform functions, including functions to:

register, by the call state listener program executing on the processor with the telephony messenger of the operating system framework, to receive from the telephony messenger program a notification of an occurrence of a first or second registered event related to calls involving the mobile station, wherein:

the first registered event is an indication of a low signal strength due to a period of network congestion resulting in a loss of signal from the wireless mobile communication network at the mobile station during a voice over internet protocol call, wherein handoff of the mobile device was unsuccessful; and the second registered event is a detection of availability of signals from the wireless communication network exceeding a predetermined level for at least a predetermined period;

monitor, by the telephony messenger program of the operating system framework, a call for the mobile station through the wireless mobile communication network;

based on the monitoring, detect, by the telephony messenger program via an interface with the wireless communication network, dropping of the call due to occurrence of first registered event;

based on the detection of the occurrence of the first registered event, sending a first notification of the occurrence of the first registered event to the call state listener program;

upon dropping the call due to loss of signal, monitor by the telephony messenger for a signal meeting or exceeding a predetermined level for a predetermined period from the network;

detect, by the telephony messenger, occurrence of the second registered event;

responsive to the detection of the second registered event, send by the telephony messenger program a second notification to the call state listener program that a wireless mobile communication network signal is available;

in response to the call state listener program receiving the second notification that the signal from the wireless exceed a predetermined level for a predetermined period, automatically re-initiate by the call state listener the call from the mobile station through the network; and provide a user of the mobile station with an option to cancel re-initiation of the call prior to reconnection of the call through the wireless mobile communication network.

18. The article of manufacture of claim 17, wherein execution of the programming by the processor further configures the mobile station to cancel the re-initiated call before completion to a destination, in response to selection of the option to cancel re-initiation of the call.

19. The article of manufacture of claim 17, wherein the programming is pre-installed or downloaded from the wireless mobile communication network upon request by a user of the mobile station.

20. The article of manufacture of claim 17, wherein the execution of the programming by the processor further configures the mobile station to store data regarding the dropped call and to reinitiate the dropped call using the stored data regarding the dropped call.

* * * * *